US008780216B2

(12) United States Patent
Nakanishi (10) Patent No.: US 8,780,216 B2
(45) Date of Patent: Jul. 15, 2014

(54) IMAGE PROCESSING DEVICE, IMAGE PROCESSING SYSTEM AND IMAGE PROCESSING METHOD

(75) Inventor: Keiri Nakanishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 13/420,092

(22) Filed: Mar. 14, 2012

(65) Prior Publication Data

US 2013/0093926 A1    Apr. 18, 2013

(30) Foreign Application Priority Data

Oct. 13, 2011   (JP) .................................. 2011-225660

(51) Int. Cl.
*H04N 5/228* (2006.01)
(52) U.S. Cl.
USPC ............................................................ 348/208.6
(58) Field of Classification Search
CPC .......... H04N 5/23248; H04N 5/23251; H04N 5/23254; H04N 5/23264; H04N 5/23267
USPC .............. 348/208.99, 208.1, 208.4, 208.6
See application file for complete search history.

(56) References Cited

U.S. PATENT DOCUMENTS 6,091,460 A *  7/2000  Hatano et al. ................. 348/699
6,480,670 B1 * 11/2002  Hatano et al. ................. 386/329
2004/0109503 A1 *  6/2004  Lee ........................... 375/240.16
2007/0177037 A1 *  8/2007  Kurata ........................... 348/241
2012/0013796 A1 *  1/2012  Sato ............................... 348/441

FOREIGN PATENT DOCUMENTS

| JP | 2006-0024065 | 2/2006 |
| JP | 2006-148496 | 6/2006 |
| JP | 2007-208580 | 8/2007 |

OTHER PUBLICATIONS

Background Art Information Sheet in one page.
U.S. Appl. No. 13/205,074, filed Aug. 8, 2011, Keiri Nakanishi.

* cited by examiner

*Primary Examiner* — Nicholas Giles
(74) *Attorney, Agent, or Firm* — Knobbe, Martens, Olson & Bear, LLP (57) ABSTRACT

According to one embodiment, an image processing system includes a pickup apparatus, a motion vector generator, a motion vector converter, a motion vector interpolator, a correction amount generator, and a correcting module. The pickup apparatus is configured to capture an image per scanning line and to generate an input video signal from the captured image. The motion vector generator is configured to generate a first horizontal direction motion vector and a first vertical direction motion vector indicative of a horizontal direction moving distance and a vertical direction moving distance respectively between frames in the input video signal.

20 Claims, 9 Drawing Sheets

● PIXEL POSITION READ OUT FROM FRAME MEMORY 12
☐ PIXEL POSITION GENERATED BY INTERPOLATION

IMAGE PROCESSING DEVICE, IMAGE PROCESSING SYSTEM AND IMAGE PROCESSING METHOD

CROSS REFERENCE TO RELATED APPLICATIONS

This application is based upon and claims the benefit of priority from the prior Japanese Patent Application No. 2011-225660, filed on Oct. 13, 2011, the entire contents of which are incorporated herein by reference.

FIELD

Embodiments described herein relate generally to an image processing device, an image processing system and an image processing method.

BACKGROUND

CMOS (Complementary Metal Oxide Semiconductor) sensors are often used in digital video cameras and so on because the CMOS sensors can be manufactured with low cost. It is general that the CMOS sensor photographs each scanning line by turns from the top part of the image to the bottom part thereof, which is called as a rolling shutter type, instead of photographing whole of a frame at the same time. Because timing when the top part of the image is photographed differs from timing when the bottom part of the image is photographed, there is a problem that moving object photographed by the CMOS sensor may be distorted. This distortion is called as a focal plane distortion.

BRIEF DESCRIPTION OF THE DRAWINGS

FIG. 10 is a block diagram showing an example of the internal configuration of motion vector interpolator 25a.

FIG. 11 is a block diagram showing an example of the internal configuration of correction amount generator 26a.

FIG. 13 is a block diagram showing an example of an internal configuration of the correcting module 27a.

DETAILED DESCRIPTION

In general, according to one embodiment, an image processing system includes a pickup apparatus, a motion vector generator, a motion vector converter, a motion vector interpolator, a correction amount generator, and a correcting module. The pickup apparatus is configured to capture an image per scanning line and to generate an input video signal from the captured image. The motion vector generator is configured to generate a first horizontal direction motion vector and a first vertical direction motion vector indicative of a horizontal direction moving distance and a vertical direction moving distance respectively between frames in the input video signal. The motion vector converter is configured to convert the first horizontal direction motion vector and the first vertical direction motion vector to a second horizontal direction motion vector and a second vertical direction motion vector respectively taking the first vertical direction motion vector into consideration, the second horizontal direction motion vector and the second vertical direction motion vector being indicative of a horizontal direction moving distance and a vertical direction moving distance respectively per a time for capturing one frame. The motion vector interpolator is configured to generate a third horizontal direction motion vector and a third vertical direction motion vector indicative of a horizontal direction moving distance and a vertical direction moving distance per a time for capturing one frame for each scanning line by performing interpolation using the second horizontal direction motion vector and the second vertical direction motion vector on at least two frames. The correction amount generator is configured to generate a horizontal direction correction amount and a vertical direction correction amount for each scanning line based on the third horizontal direction motion vector and the third vertical direction motion vector. The correcting module is configured to correct the input video signal to produce an output video signal based on the horizontal direction correction amount and the vertical direction correction amount.

Embodiments will now be explained with reference to the accompanying drawings.

(First Embodiment)

Figure 1:
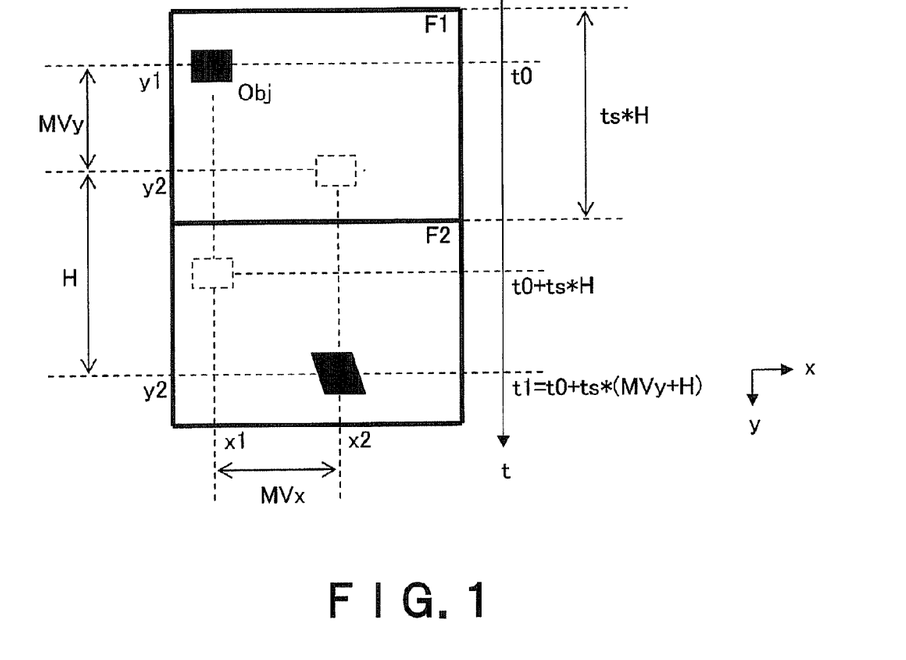
FIG. 1 is a diagram explaining a principle for correcting the focal plane distortion using a motion vector.

FIG. 1 is a diagram explaining a principle for correcting the focal plane distortion using a motion vector. FIG. 1 shows two successive frames F1 and F2 photographed by a CMOS sensor of the rolling shutter type.

The CMOS sensor does not photograph whole of the frame F1 at the same time, but photographs each scanning line by turns from the top part of the image to the bottom part of the image. When time necessary to photograph one scanning line is defined as "ts" and the number of the total scanning lines of each frame is defined as "H", it takes time ts*H for the CMOS sensor to photograph all of the scanning lines of the frame F1, and then, the CMOS sensor photographs each scanning line by turns from the top part of the following frame F2 to the bottom part thereof.

It is assumed that an object Obj whose center locates at (x1, y1) in the frame F1 moves to (x2, y2) in the frame F2. That is, a horizontal direction motion vector (first horizontal direction motion vector) MVx1 indicative of the moving distance between the frames in the horizontal direction is that MVx1=x2−x1, and a vertical direction motion vector (first vertical direction motion vector) MVy1 indicative of moving distance between the frames in the vertical direction is that MVy1=y2−y1.

Here, when it is assumed that a scanning line including (x1, y1) of the frame F1 is photographed at time t0, a scanning line including (x2, y2) of the frame F2 is photographed at time "t1=t0+ts*(MVy1+H)". Therefore, it takes "t1−t0=ts*(MVy1+H)" for the object Obj to move by a distance of the horizontal direction motion vector MVx1. Accordingly, if the CMOS sensor is still or moves at a constant speed, a horizontal direction motion vector MVx2 (second horizontal direction motion vector) and a vertical direction motion vector MVy2 (second vertical direction motion vector) indicative of the moving distance of the object Obj in the horizontal direction and the vertical direction per the time "ts*H" for photographing one frame are expressed by the following equations, respectively.

$$MVx2=MVx1*H/(MVy1+H) \quad (1)$$

$$MVy2=MVy1*H/(MVy1+H) \quad (2)$$

By such a manner, the motion vectors MVx1 and MVy1 indicative of the moving distances between the frames are converted to the motion vectors MVx2 and MVy2 indicative of the moving distances per the time for photographing one frame, respectively.

However, when the CMOS sensor moves with acceleration, the horizontal direction and the vertical direction motion vectors differ depending on the positions of the scanning line. Therefore, it is preferable that the motion vectors MVx2 and MVy2 are corrected.

Figure 2:
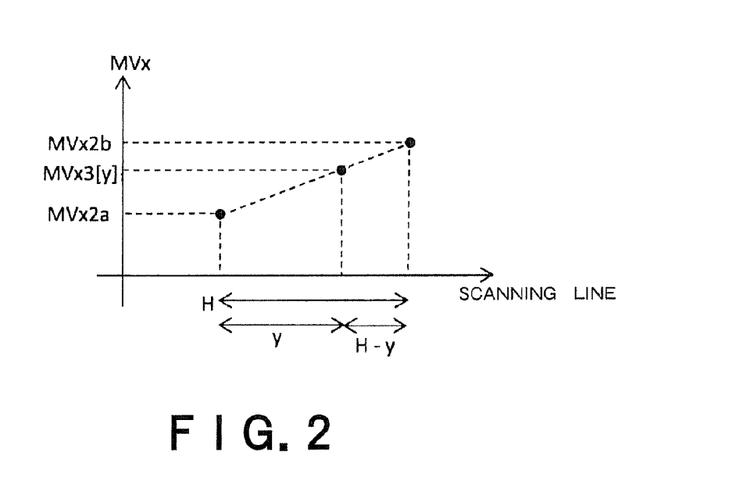
FIG. 2 is a diagram showing an example of correcting the motion vectors MVx2 and MVy2.

FIG. 2 is a diagram showing an example of correcting the motion vectors MVx2 and MVy2. Although FIG. 2 shows the horizontal direction motion vector, the vertical direction motion vector can be corrected similarly to the horizontal direction motion vector. It is assumed that the motion vectors at a frame Fa calculated by the above equations (1) and (2) are defined as MVx2a and MVy2a, and those at a following frame Fb are defined as MVx2b and MVy2b. These values show, for example, motion vectors at photographing the first line in the frames Fa and Fb, respectively.

Then, a horizontal direction motion vector MVx3[y] (third horizontal direction motion vector) and a vertical direction motion vector MVy3[y] (third vertical direction motion vector) indicative of the moving distances in the horizontal direction and the vertical direction per the time for photographing one frame at the y-th scanning line in the frame Fa are calculated by the following equations (3) and (4), respectively.

$$MVx3[y]=\{MVx2b*y+MVx2a*(H-y)\}/H \quad (3)$$

$$MVy3[y]=\{MVy2b*y+MVy2a*(H-y)\}/H \quad (4)$$

Above equations (3) and (4) are examples where the motion vectors MVx3[y] and MVy3[3] at the y-th scanning line are calculated by linear interpolation using the motion vectors of two frames. It should be noted that second-order interpolation, third-order interpolation or spline interpolation and so on can be applied using the motion vectors of three or more frames.

The motion vectors MVx3[y] and MVy3[y] indicate the moving distances per the time for photographing one frame. Therefore, the moving distances per photographing one line are MVx3[y]/H and MVy3[y]/H. Accordingly, the object Obj moves by a horizontal direction moving distance dx[y] and a vertical direction moving distance dy[y] expressed by the following equations (5) and (6) respectively during photographing the first scanning line through the y-th scanning line.

$$dx[y] = \sum_{v=0}^{y} \frac{MVx3[v]}{H} \quad (5)$$

$$dy[y] = \sum_{v=0}^{y} \frac{MVy3[v]}{H} \quad (6)$$

Thus, the object Obj is distorted as shown in FIG. 1 because the moving distance differs depending on the position "y" of the scanning line even in the object Obj.

Therefore, the horizontal direction moving distance dx[y] for each scanning line "y" is set as a horizontal direction correction amount MODx[y] (dx[y]=MODx[y]), and the vertical direction moving distance dy[y] for each scanning line "y" is set as a vertical direction correction amount MODy[y] (dy[y]=MODy[y]). If the pixel at (x, y) was photographed at the same time with the first scanning line, the correction amounts MODx[y] and MODy[y] mean that the pixel at (x, y) would be at (x−MODx[y], y−MODy[y]). Accordingly, by replacing the pixel at (x−MODx[y], y−MODy[y]) by a pixel at (x, y), in the other word, by replacing the pixel at (x, y) by a pixel at (x+MODx[y], y+MODy[y]), the focal plane distortion can be corrected.

In such a manner, taking the vertical direction motion vector MVy1 into consideration, the motion vectors MVx2 and MVy2 indicative of the moving distance per a time for photographing one frame are calculated. Furthermore, taking the acceleration of the CMOS sensor into consideration, the motion vectors MVx3[y] and MVy3[y] indicative of the horizontal and the vertical direction moving distance respectively are calculated for each scanning line. Based thereon, the input video signal is corrected using the correction amounts MODx[y] and MODy[y] as the moving distance during a time photographing the first to the y-th scanning lines. Because of this, the focal plane distortion can be precisely corrected.

Especially, even if the CMOS sensor moves with acceleration, for example, the CMOS sensor which has been moved at a constant speed stops suddenly, the focal plane distortion can be precisely corrected since the acceleration of the CMOS sensor is considered.

Figure 3:
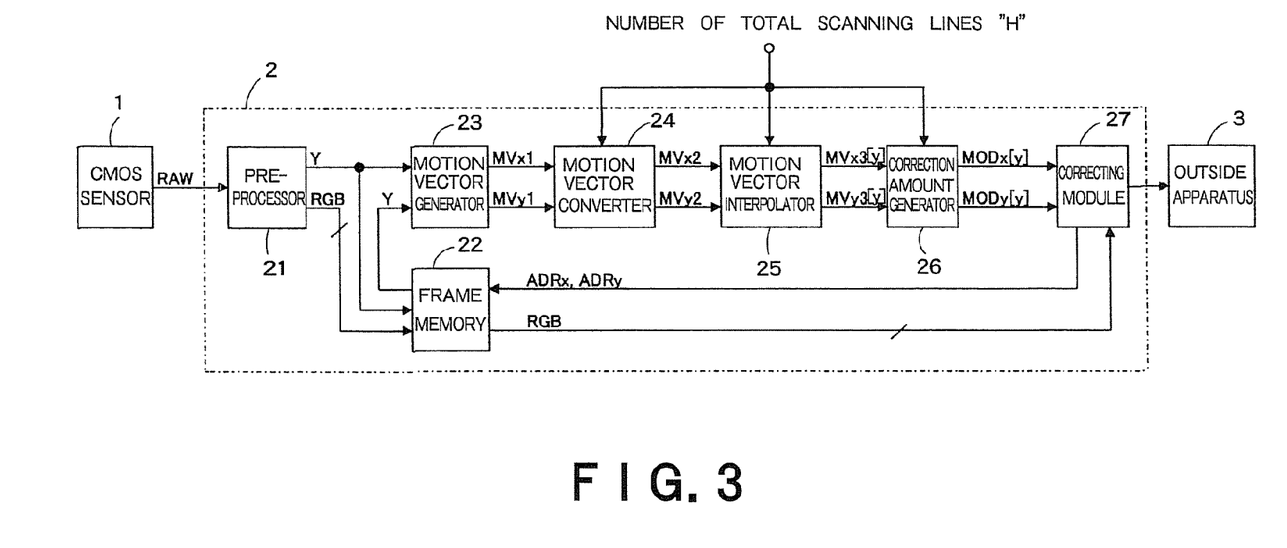
FIG. 3 is a schematic block diagram showing an image processing system according to a first embodiment.

FIG. 3 is a schematic block diagram showing an image processing system according to a first embodiment. The image processing system has a CMOS sensor 1, an image processing device 2 and an outside apparatus 3. An input video signal, which is RAW data acquired by the CMOS sensor 1, is inputted to the image processing device 2. The image processing device 2 corrects the focal plane distortion on the input video signal to generate an output video signal. The outside apparatus 3 is, for example, a display such as liquid crystal display for displaying the output video signal or a recording medium such as a flash memory or hard disk for recording the output video signal.

The image processing device 2 has a pre-processor 21, a frame memory 22, a motion vector generator 23, a motion vector converter 24, a motion vector interpolator 25, a correction amount generator 26, and a correcting module 27. Although the present embodiment shows an example where the CMOS sensor 1 is provided separately from the image processing device 2, it is possible to mount the CMOS sensor 1 and the image processing device 2 on one chip.

The pre-processor 21 RGB-interpolates the RAW data inputted from the CMOS sensor 1 to generate RGB values of each pixel. Then, the pre-processor 21 matrix-converts the RGB values to generate a Y (brightness) component. The generated RGB values and the Y component are stored in the frame memory 22. The frame memory 22 can, for example, store pixel information of two frames. Here, the RGB values of pixel located at (x, y) of each frame are stored in addresses (x, y) corresponding to each frame in the frame memory 12, respectively.

The motion vector generator 23 performs motion vector search by using the Y component of the present frame inputted from the CMOS sensor 1 and the Y component of the past frame stored in the frame memory 22, to generate one horizontal direction motion vector MVx1 and one vertical direction motion vector MVy1 by a frame. The generated motion vectors MVx1 and MVy1 are inputted to the motion vector converter 24.

More specifically, some blocks (for example, five blocks) having multiple pixels are set in a frame, and the motion vector search is performed by block-matching operation using a sum of absolute difference between the blocks. Then, an average or a median of motion vectors of all blocks is set as a motion vector of the frame. In another manner, the present and the past frames are scaled-down, and the motion vector search is performed by a scanning line to temporarily store the searched motion vector in a line memory (not shown) for motion vectors in the motion vector generator 23. Then, a median of motion vectors of all scanning lines is set as a motion vector of the frame.

Furthermore, the image encoder (not shown) and so on can be provided separately from the image processing device 2 to supply the motion vector to the motion vector generator 23. In this case, it is unnecessary to use the Y components of the present and the past frames.

The motion vectors MVx1 and MVy2 indicative of the moving distance between frames, and the number of the total scanning lines "H" set by the host processor and so on (not shown) provided outside, are inputted to the motion vector converter 24. The motion vector converter 24 generates the motion vectors MVx2 and MVy2 indicative of the moving distance per a time for photographing one frame based on the above equations (1) and (2), respectively.

Figure 4:
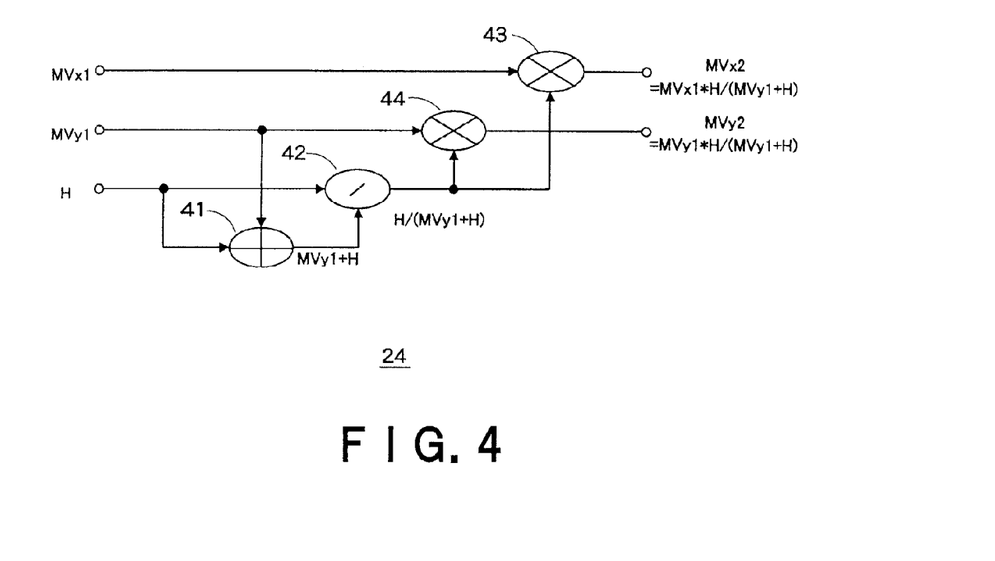
FIG. 4 is a block diagram showing an example of an internal configuration of the motion vector converter 24.

FIG. 4 is a block diagram showing an example of an internal configuration of the motion vector converter 24. The motion vector converter 24 has an adder 41, a divider 42, multipliers 43 and 44. The adder 41 generates (MVy1+H). The divider 42 generates (H/(MVy1+H)). The multipliers 43 and 44 generate the motion vectors MVx2 and MVy2, respectively.

Back to FIG. 3, the motion vectors MVx2 and MVy2 and the number of the total scanning line "H" are inputted to the motion vector interpolator 25. The motion vector interpolator 25 performs liner-interpolation processing, for example, based on the above equations (3) and (4), to generate the motion vectors MVx3[y] and MVy3[y] for each scanning line taking the acceleration of the CMOS sensor 1 in to consideration. Here, the motion vectors MVx2 includes a motion vector MVx2a with regard to one frame and a motion vector MVx2b with regard to the following frame. Similarly, the motion vector MVy2 includes motion vectors MVy2a and MVy2b.

Figure 5:
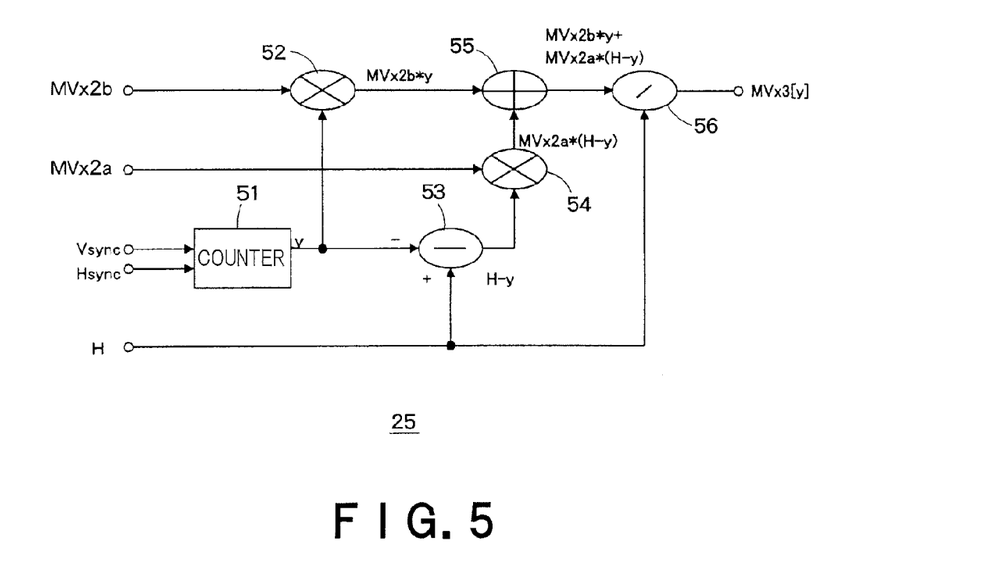
FIG. 5 is a block diagram showing an example of an internal configuration of the motion vector interpolator 25.

FIG. 5 is a block diagram showing an example of an internal configuration of the motion vector interpolator 25. The motion vector interpolator 25 has a counter 51, a multiplier 52, a subtractor 53, a multiplier 54, an adder 55 and a divider 56. It should be noted that only a block diagram for generating the motion vector MVx3[y] is shown because the motion vectors MVx3[y] and MVy3[y] can be calculated with similar equations.

A vertical synchronization signal Vsync and a horizontal synchronization signal Hsync are inputted to the counter 51. The counter 51 generates a position "y" of the scanning line by counting the number of pulses of the horizontal synchronization signal Hsync and resetting the counted value in synchronization with the vertical synchronization signal Vsync. The multiplier 52 generates (MVx2b*y). The subtractor 53 generates (H−y). The multiplier 54 generates (MVx2a*(H−y)). The adder 55 generates (MVx2b*y+MVx2a*(H−y)). The divider 56 generates the motion vector MVx3[y].

Back to FIG. 3, the motion vectors MVx3[y] and MVy3[y] and the number of the total scanning line "H" are inputted to the correction amount generator 26. The correction amount generator 26 calculates the moving distances dx[y] and dy[y] during photographing the first to the y-th scanning lines, that is, the horizontal direction correction amount MODx[y] and the vertical direction correction amount MODy[y] based on the above equations (5) and (6), respectively.

Figure 6:
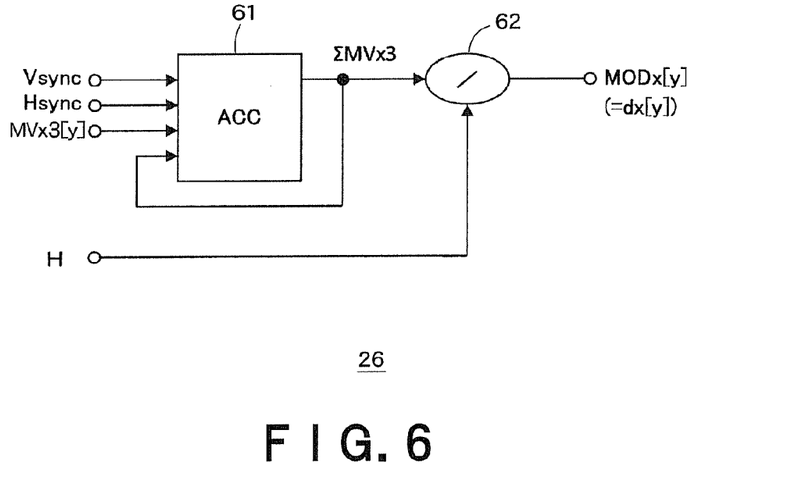
FIG. 6 is a block diagram showing an example of an internal configuration of the correction amount generator 26.

FIG. 6 is a block diagram showing an example of an internal configuration of the correction amount generator 26. The correction amount generator 26 has an accumulator (ACC) 61 and a divider 62. It should be noted that only a block diagram for generating the correction amount MODx[y] is shown because the correction amounts MODx[y] and MODy[y] can be calculated with similar equations.

The vertical synchronization signal Vsync, the horizontal synchronization signal Hsync and the motion vector MVx3[y] depends on the scanning line are inputted to the accumulator 61. When the vertical synchronization signal Vsync shows a top of a frame, the accumulator 61 resets the accumulated value to be "0". When the horizontal synchronization signal Hsync shows a beginning of a scanning line, the accumulator 61 adds the accumulated value to the motion vector MVx3[y] and outputs the accumulated value. Otherwise, the accumulator 61 holds the accumulated value and outputs it. The accumulated value is ΣMVx3[v] (v=0 to y). The divider 62 divides the accumulated value by the number of the total scanning lines "H" to generate the correction amount MODx[y]. It should be noted that decimal parts are cut off or rounded off, for example, so that the correction amounts MODx[y] and MODy[y] become integer numbers in the present embodiment.

Back to FIG. 3, the correcting module 27 corrects the input video signal by using the correction amounts MODx[y] and MODy[y] and the RGB values of the present frame stored in the frame memory 22. More specifically, the correcting module 27 replaces the RGB values of a pixel located at (x, y) by those of a pixel located at (x+MODx[y], y+MODy[y]).

Figure 7:
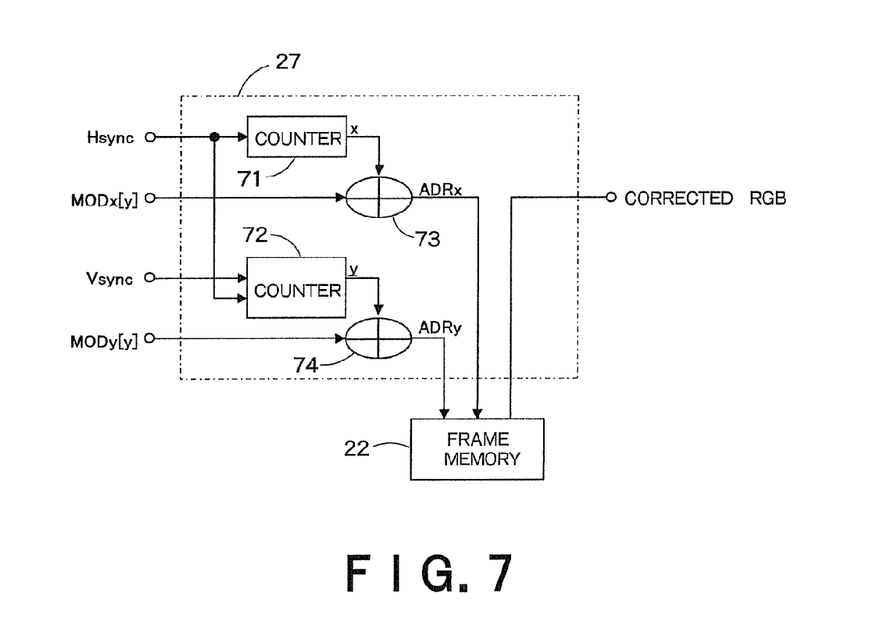
FIG. 7 is a block diagram showing an example of an internal configuration of the correcting module 27.

FIG. 7 is a block diagram showing an example of an internal configuration of the correcting module 27. The correcting module 27 has counters 71 and 72, and adders 73 and 74. The horizontal synchronization signal Hsync is inputted to the counter 71. The counter 71 calculates the position "x" by repeating count-up while resetting the count value in synchronization with assert of the horizontal direction synchronization signal Hsync. The adder 73 adds the position "x" to the horizontal direction correction amount MODx[y] to generate a horizontal direction address ADRx (=x+MODx[y]). The vertical direction synchronization signal Vsync and the horizontal direction synchronization signal Hsync are inputted to the counter 72. The counter 72 calculates the position "y" by counting-up the number of the horizontal direction synchronization signal Hsync while resetting the count value in synchronization with assert of the vertical direction synchronization signal Vsync. The adder 74 adds the position "y" to the vertical direction correction amount MODy[y] to generate a vertical direction address ADRy (=y+MODy[y]). Then, the RGB values stored at the address (ADRx, ADRy) are read out from the frame memory 22 to set as the corrected output video signal. By such a manner, the focal plane distortion can be suppressed.

Figure 8:
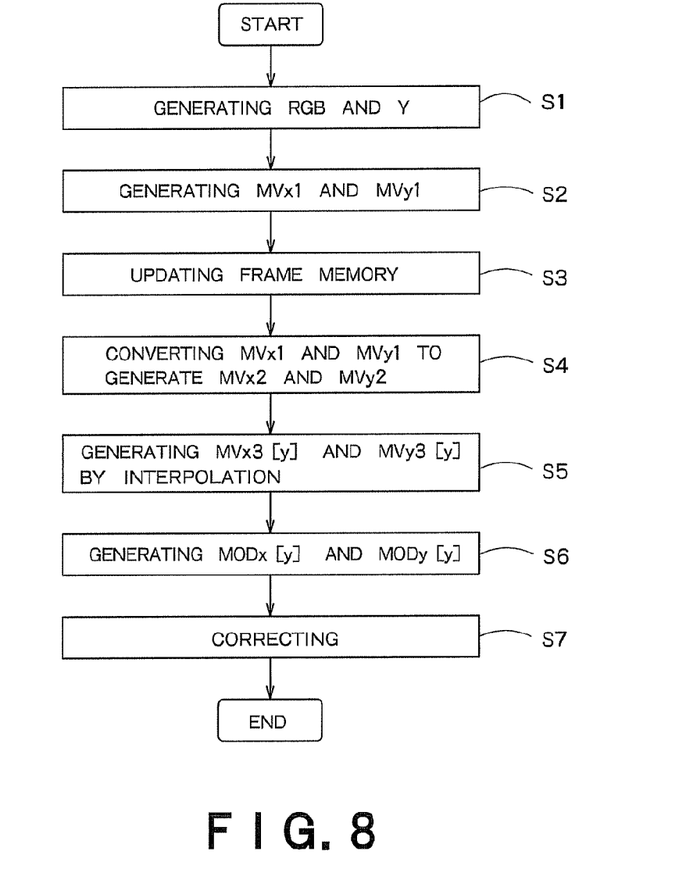
FIG. 8 is a flowchart showing the processing operation of the image processing device 2.

FIG. 8 is a flowchart showing the processing operation of the image processing device 2. It is assumed that the Y component and the RGB values of a frame F1 are stored in the frame memory 22. When the input video signal of a frame F2, which follows the frame F1, is inputted, the pre-processor 21 generates the RGB values and the Y component (S1). Next, the motion vector generator 23 generates the motion vectors MVx1 and MVy1 using the Y component of the present frame F2 and that of the past frame F1 stored in the frame memory 22 (S2). Then, the RGB values and the Y component stored in the frame memory 12 are updated to RGB values and the Y component of the frame F2 (S3).

Next, the motion vector converter 24 converts the motion vectors MVx1 and MVy1 based on the above equations (1) and (2) to generate the motion vectors MVx2 and MVy2, respectively (S4). Then, the motion vector interpolator 25 performs liner-interpolation based on the above equations (3) and (4) taking the acceleration of the CMOS sensor 1 into consideration to generate the motion vectors MVx3[y] and MVy3[y], respectively (S5).

After that, the correction amount generator 26 generates the correction amounts MODx[y] and MODy[y] in consideration of the horizontal direction motion vector MVy by each scanning line position "y" based on the above equations (5) and (6), respectively (S6). Then, the correcting module 27 corrects the RGB values located at position (x, y) by using the correction amounts MODx[y] and MODy[y] and the RGB values of the frame F1 stored in the frame memory 22 (S7). The output video signal including the corrected RGB values is supplied to the outside apparatus 3.

As stated above, in the first embodiment, the correction amounts MODx[y] and MODy[y] are generated taking the vertical direction motion vector MVy1 and the acceleration of the CMOS sensor 1. Therefore, the focal plane distortion can be precisely corrected.

Note that, although the frame memory 22 stores pixel information of two frames in the above example, it is not always necessary to provide a memory for storing two frames. For example, it is possible to use a frame memory for storing one frame and a line memory for storing a predetermined number of lines. Here, the predetermined number corresponds to a maximum among a maximum of the correction amount MODy[y] necessary for the correction of the vertical direction and a maximum of the horizontal direction of the motion vector searching range necessary for the motion vector search.

(Second Embodiment)

In the first embodiment, only the number of total scanning line "H" set from outside to the motion vector interpolator 25 and the correction amount generator 26, and the motion vector interpolator 25 and the correction amount generator 26 generate the motion vectors MVx3[y], MVy3[y] and correction amounts MODx[y], MODy[y], respectively. On the other hand, in a second embodiment, further parameters are set to a motion vector interpolator 25a and a correction amount generator 26a to generate the motion vectors MVx3[y], MVy3[y] and correction amounts MODx[y], MODy[y].

Figure 9:
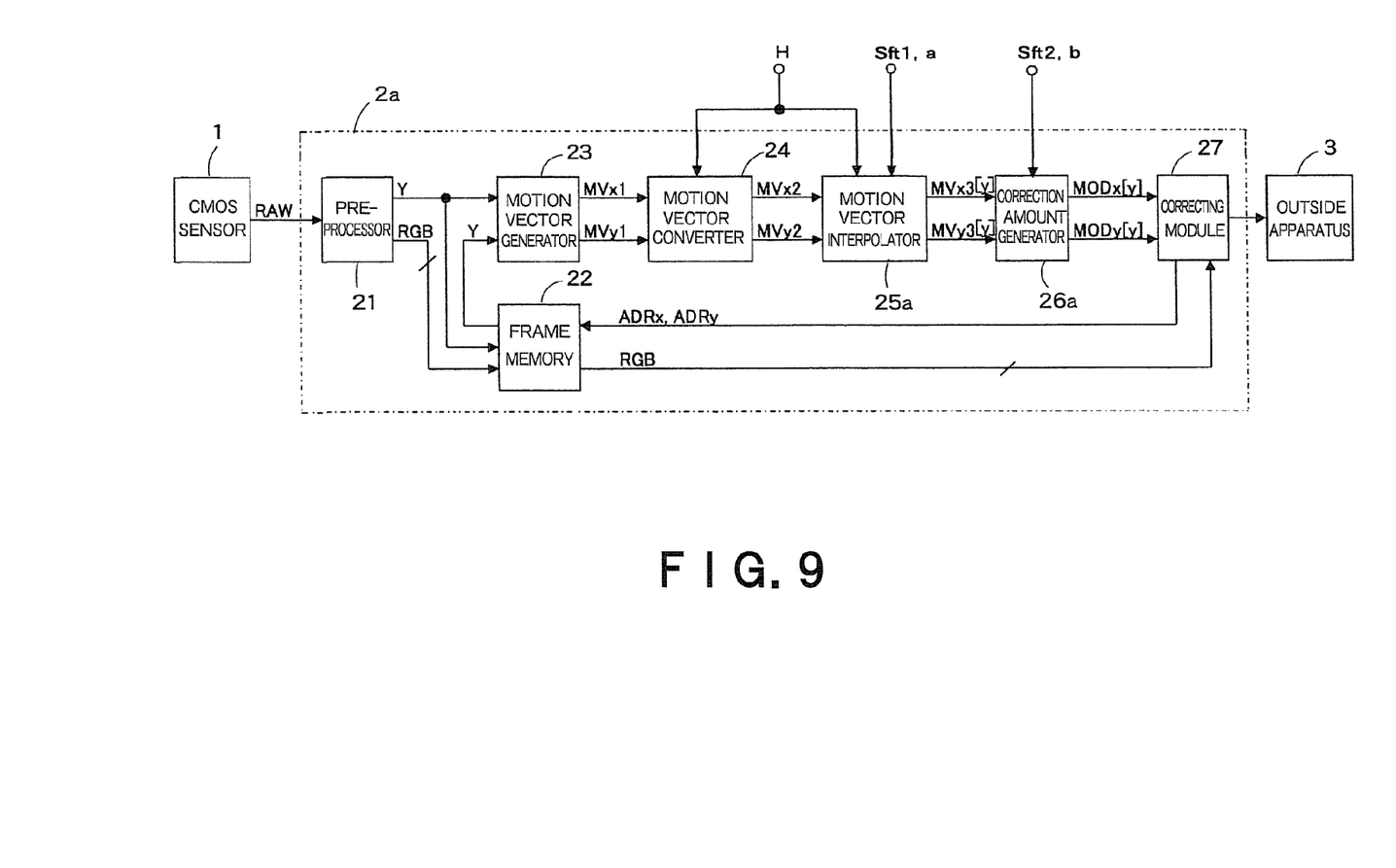
FIG. 9 is a schematic block diagram showing an image processing system according to a second embodiment.

FIG. 9 is a schematic block diagram showing an image processing system according to a second embodiment. In FIG. 9, similar reference numerals are assigned to the components common to those in FIG. 3. Hereinafter, differences from FIG. 3 will be mainly explained.

Firstly, the internal configuration of the motion vector interpolator 25a in the image processing device 2a of FIG. 9 is different from the motion vector interpolator 25 of FIG. 3. Not only the number of total scanning line "H", but also an arbitrary coefficient "a" and a bit shift amount "Sft1" are set from outside to the motion vector interpolator 25a as parameters. Then, the motion vector interpolator 25a generates the motion vectors MVx3[y] and MVy3[y] based on the following equations (7) and (8), respectively.

$$MVx3[y] = \{MVx2b*y + MVx2a*(H-y)\}*a >> Sft1 \quad (7)$$

$$MVy3[y] = \{MVy2b*y + MVy2a*(H-y)\}*a >> Sft1 \quad (8)$$

Here, ">>" means bit-shifting by the bit shift amount Sft1, which is equal to dividing by $2^{Sft1}$.

Figure 10:
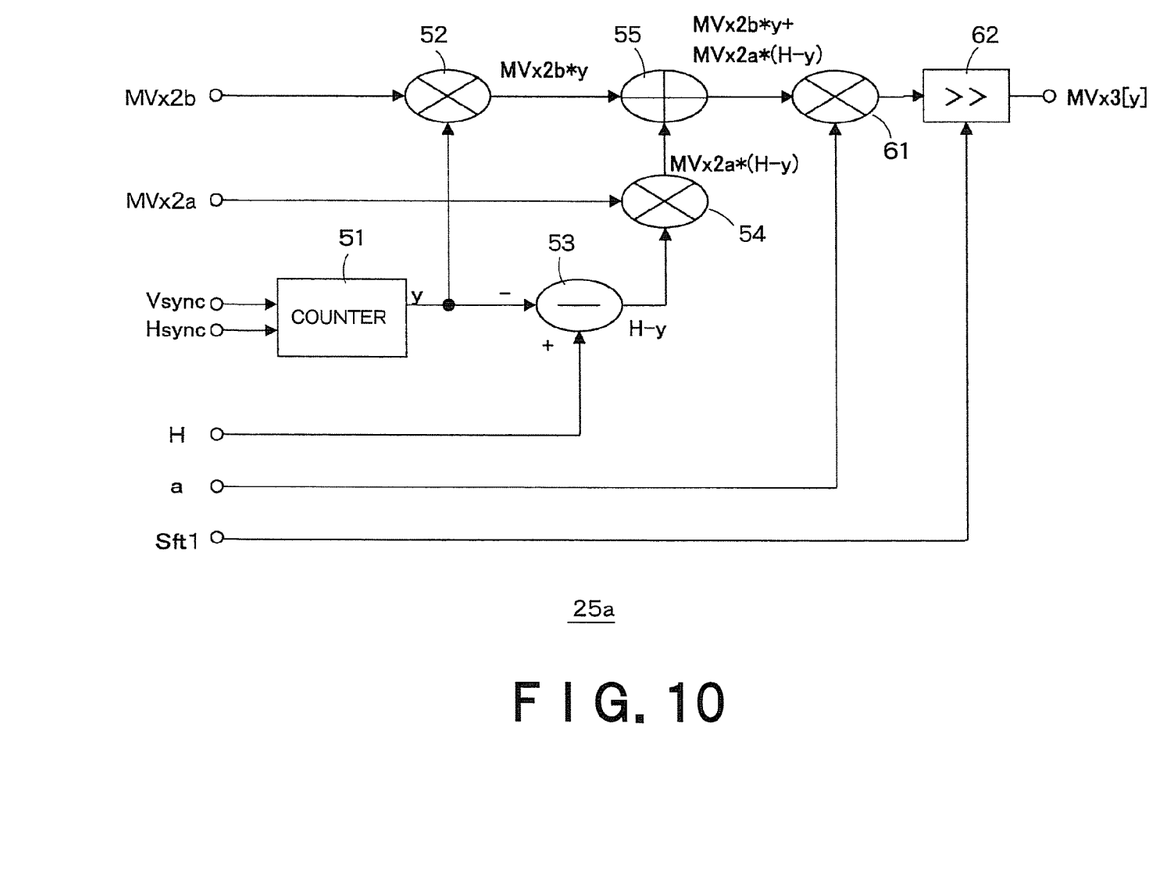

FIG. 10 is a block diagram showing an example of the internal configuration of motion vector interpolator 25a. Hereinafter, the differences from the motion vector interpolator 25 of FIG. 5 will be explained. The motion vector interpolator 25a has a multiplier 61 and a bit-shifter 62. The multiplier 61 multiplies the output of the adder 55 by the coefficient "a" to generate {MVx2b*y+MVx2a*(H-y)}*a. The bit-shifter 62 bit-shifts the output of the multiplier 61 by the bit shift amount "Sft1" to generate the motion vector MVx3[y].

Furthermore, the internal configuration of the com26correction amount generator 26a in the image processing device 2a of FIG. 9 is different from the correction amount generator 26 of FIG. 3. An arbitrary coefficient "b" and a bit shift amount "Sft2" are set from outside to the correction amount generator 26a as parameters. Then, the correction amount generator 26a generates the moving distances dx[y] and dy[y], that is, the horizontal direction correction amount MODx[y] and the vertical direction correction amount MODy[y] based on the following equations (9) and (10), respectively.

$$dx[y] = MODx[y] = b * \sum_{v=0}^{y} MVx3[v] >> Sft2 \quad (9)$$

$$dy[y] = MODy[y] = b * \sum_{v=0}^{y} MVy3[v] >> Sft2 \quad (10)$$

Note that, in the second embodiment, the coefficient "b" and the bit shift amount "Sft2" are defined so that the correction amounts MODx[y] and MODy[y] becomes integer numbers.

Figure 11:
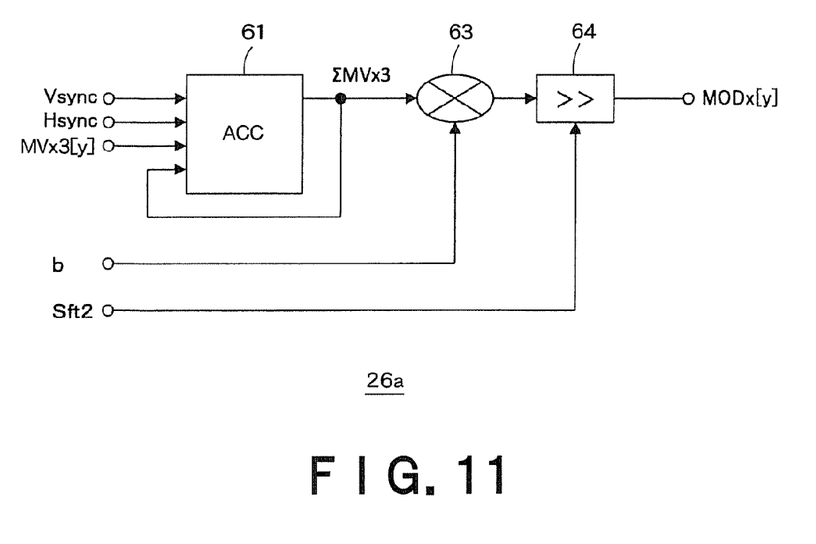

FIG. 11 is a block diagram showing an example of the internal configuration of correction amount generator 26a. Hereinafter, the differences from the correction amount generator 26 of FIG. 6 will be explained. The correction amount generator 26a has a multiplier 63 and a bit-shifter 64. The multiplier 63 multiplies the output of the accumulator 61 by the coefficient "b" to generate b*ΣMVx3[v] (v=0 to y). The bit-shifter 64 bit-shifts the output of the multiplier 63 by the bit shift amount "Sft2" to generate the correction amount MODx[y] of the above equation (9).

By setting the parameters in the equations (7) to (10) from outside, the correction amount can be adjusted flexibly. For example, when the correction amounts want to be set small in order to suppress wrong correction, the coefficients "a" and "b" are set smaller than a value corresponding to one. Because the motion vectors MVx3[y] and MVy3[y] are proportional to the coefficient "a" and the correction amounts MODx[y] and MODy[y] are proportional to the coefficient "b", the adjustment can be performed simply.

Especially, when the image processing device 2a is implemented by hardware, it is possible to adjust the correction amounts with downsized hardware by multiplying the coefficients "a" and "b" and bit-shifting comparing to a case where another divider is provided in the hardware.

As stated above, in the second embodiment, the coefficients "a", "b" and bit shift amounts "Sft1", "Sft2", in addition to the number of total scanning lines "H" in the first embodiment, are set from outside to generate the correction amounts MODx[y] and MODy[y]. Therefore, the correction amount can be adjusted simply.

(Third Embodiment)

In the first and the second embodiments, the correction amounts MODx[y] and MODy[y] are integer numbers, and the correction is performed by replacing the correction target pixel by one of pixels present in the frame. On the other hand, in a third embodiment, which will be described below, the correction amounts MODx[y] and MODy[y] are decimal numbers, and the correction is performed by replacing the correction target pixel by a pixel generated by interpolation using one or more pixels.

Figure 12:
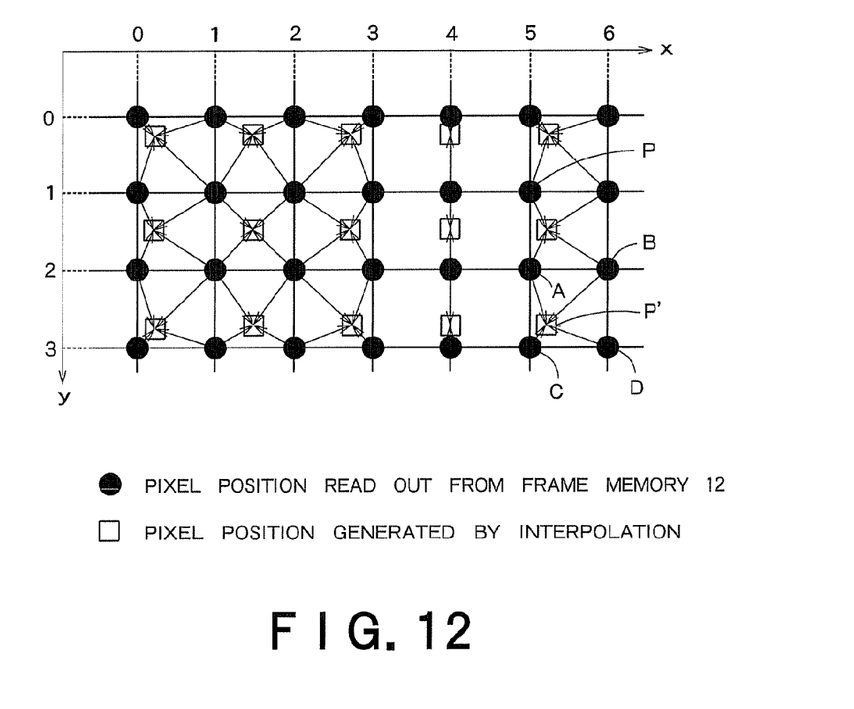
FIG. 12 is a diagram for explaining the correction according to the third embodiment.

FIG. 12 is a diagram for explaining the correction according to the third embodiment. FIG. 12 shows an example where the correction amounts MODx[y] and MODy[y] having decimal two bits, that is, a unit of "0.25", are calculated. Black circles of FIG. 12 show locations of pixels read out from the frame memory, the locations locating only on integer coordinates. On the other hand, white rectangles show locations of pixels having a possibility to be replaced, the locations locating on coordinates whose unit is "0.25". The pixels located at these locations are generated by interpolation.

For example, a pixel located at a position P(5, 1), having a horizontal direction correction amount MODx[1] of "0.25" and a vertical direction correction amount MODy[1] of "1.75", should be replaced by a pixel located at a position P'(5.25, 2.75). Practically, a pixel does not exist on the position P'(5.25, 2.75). Therefore, RGB values of the pixel located at the position P'(5.25, 2.75) are generated by convolution operation (filter operation) interpolation using RGB values of adjacent pixels, for example pixels located at positions A(5, 2), B(6, 2), C(5, 3) and D(6, 3). Then, the RGB values of the pixel located at P(5, 1) are replaced by the RGB values of the pixel located at P'(5.25, 2.75) generated by the interpolation. By such a manner, correction accuracy improves by controlling the decimal parts of the correction amounts MODx[y] and MODy[y].

In order to calculate the decimal parts of the correction amounts MODx[y] and MODy[y], decimal parts are calculated by using the equations (5) and (6) in the first embodiment, or the bit shift amount "Sft2" is set small in the second embodiment.

Figure 13:
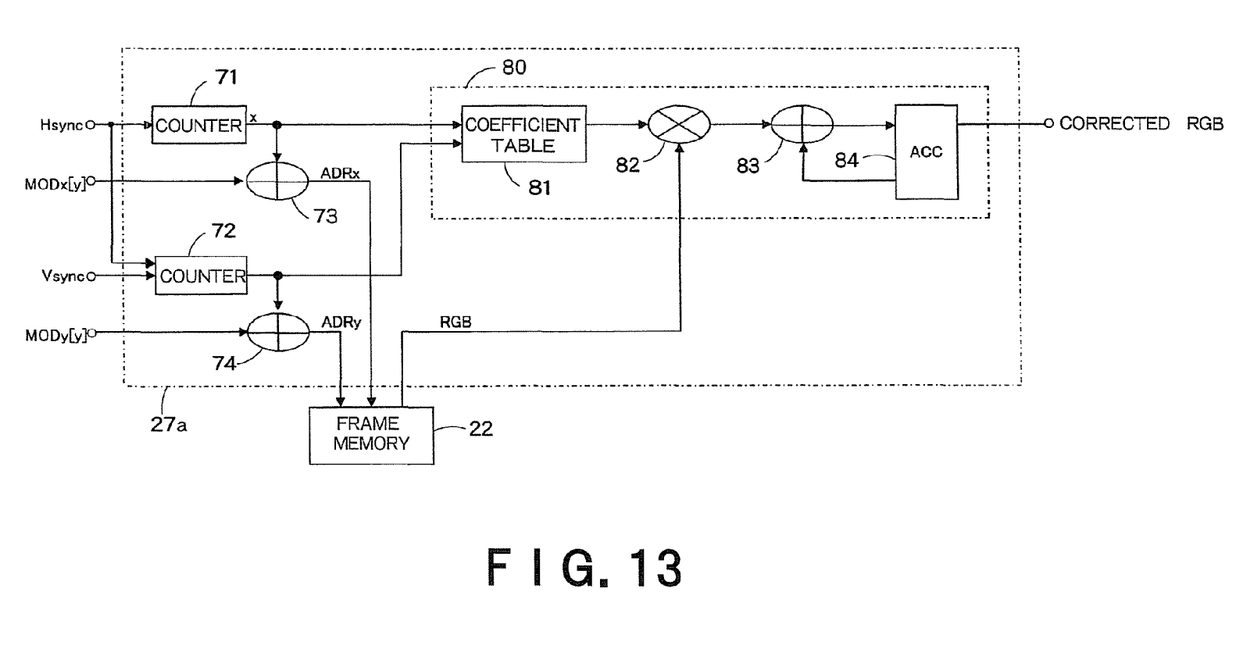

FIG. 13 is a block diagram showing an example of an internal configuration of the correcting module 27a according to the third embodiment. The correcting module 27a has counters 71 and 72, adders 73 and 74, and an interpolator 80. The interpolator 80 has a coefficient table 81, a multiplier 82, an adder 83 and an accumulator (ACC) 84.

Hereinafter, the operation of the correcting module 27a of FIG. 13 will be explained in a condition same as FIG. 12. The counters 71 and 72 calculate positions "x" and "y", respectively. Furthermore, the adders 73 and 74 generate the horizontal direction address ADRx (=x+MODx[y]) and the vertical direction address ADRy (=y+MODy[y]), respectively. Here, because the correction amounts MODx[y] and MODy[y] have decimal parts of two bits, the addresses ADRx and ADRy also have decimal parts of two bits.

Then, the RGB values of pixels locating on integer coordinates around the address (ADRx, ADRy) are read out. The multiplier 82 multiplies a filter coefficient stored in the coefficient table 81 determined according to a distance to the address (ADRx, ADRy) by each of the read-out RGB values, and an output of the multiplier 82 is accumulated by the adder 83 and the accumulator 84.

In the example of FIG. 12, the above processing are performed with respect to the addresses (5, 2), (6, 2), (5, 3) and (6, 3) locating around the address (5.25, 2.75). The RGB values of address (5, 3) are multiplied by a filter coefficient of a relatively large value since the distance to the address (5.25, 2.75) are small. On the other hand, the RGB values of address (6, 2) are multiplied by a filter coefficient of a relatively small value since the distance to the address (5.25, 2.75) are large.

The RGB values obtained by such a manner are set as the corrected RGB values.

In the present embodiment, multiple times of accesses to the frame memory 22 are performed per one pixel in the convolution operation on calculating the RGB values by interpolation. However, because of data locality in the frame in the convolution operation, power consumption and/or memory access latency can be decreased by providing a frame memory reference cache (not shown) between the frame memory 22 and the correcting module 27a or a memory reference controller (not shown).

Note that, although the correction amounts MODx[y] and MODy[y] have decimal parts of two bits in the third embodiment, the correction amounts MODx[y] and MODy[y] can have further decimal parts. Additionally, any interpolation manner is applicable, and RGB values of more than four pixels or only one most adjacent pixel can be used for interpolation.

As stated above, in the third embodiment, the decimal parts of the correction amounts MODx[y] and MODy[y] are calculated, and correction is performed by using the RGB values of a pixel generated by interpolation using one ore more pixels. Therefore, the correction amounts can be controlled more finely, thereby improving the correction accuracy.

Note that, it is enough that the input video signal of the first to the third embodiments is photographed in an order of the scanning lines, and the input video signal can be photographed not the CMOS sensor but other image pickup apparatus.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing system comprising:
    a pickup apparatus configured to capture an image per scanning line and to generate an input video signal from the captured image;

a motion vector generator configured to generate a first horizontal direction motion vector and a first vertical direction motion vector indicative of a horizontal direction moving distance and a vertical direction moving distance respectively between frames in the input video signal;

a motion vector converter configured to convert the first horizontal direction motion vector and the first vertical direction motion vector to a second horizontal direction motion vector and a second vertical direction motion vector respectively taking the first vertical direction motion vector into consideration, the second horizontal direction motion vector and the second vertical direction motion vector being indicative of a horizontal direction moving distance and a vertical direction moving distance respectively per a time for capturing one frame;

a motion vector interpolator configured to generate a third horizontal direction motion vector and a third vertical direction motion vector indicative of a horizontal direction moving distance and a vertical direction moving distance per a time for capturing one frame for each scanning line by performing interpolation using the second horizontal direction motion vector and the second vertical direction motion vector on at least two frames;

a correction amount generator configured to generate a horizontal direction correction amount and a vertical direction correction amount for each scanning line based on the third horizontal direction motion vector and the third vertical direction motion vector; and a correcting module configured to correct the input video signal to produce an output video signal based on the horizontal direction correction amount and the vertical direction correction amount.

2. The system of claim 1, wherein the correction amount generator is configured to generate the horizontal direction correction amount based on a following equation (1) and generate the vertical direction correction amount based on a following equation (2), $$MODx[y] = \sum_{v=0}^{y} \frac{MVx3[v]}{H} \tag{1}$$

$$MODy[y] = \sum_{v=0}^{y} \frac{MVy3[v]}{H} \tag{2}$$

where the MODx[y] is the horizontal direction correction amount for a y-th scanning line, the MVx3[v] is the third horizontal direction motion vector for a v-th scanning line, the MODy[y] is the vertical direction correction amount for the y-th scanning line, the MVy3[v] is the third vertical direction motion vector for the v-th scanning line, and the "H" is the number of total scanning line.

3. The system of claim 1, wherein the correction amount generator is configured to generate the horizontal direction correction amount based on a following equation (3) and generate the vertical direction correction amount based on a following equation (4), $$MODx[y] = b * \sum_{v=0}^{y} MVx3[v] >> Sft2 \tag{3}$$

$$MODy[y] = b * \sum_{v=0}^{y} MVy3[v] >> Sft2 \tag{4}$$

where the MODx[y] is the horizontal direction correction amount for a y-th scanning line, the MVx3[v] is the third horizontal direction motion vector for a v-th scanning line, the MODy[y] is the vertical direction correction amount for the y-th scanning line, the MVy3[v] is the third vertical direction motion vector for the v-th scanning line, the "b" is an arbitrary constant, the "Sft2" is an arbitrary bit shift amount.

4. The system of claim 1, wherein the motion vector interpolator is configured to perform linear-interpolation, second-order interpolation, third-order interpolation or spline interpolation to generate the third horizontal direction motion vector and the third vertical direction motion vector.

5. The system of claim 1, wherein the motion vector interpolator is configured to generate the third horizontal direction motion vector based on a following equation (5) and generate the third vertical direction motion vector based on a following equation (6), $$MVx3[y]=\{MVx2b*y+MVx2a*(H-y)\}/H \tag{5}$$

$$MVy3[y]=\{MVy2b*y+MVy2a*(H-y)\}/H \tag{6}$$

where the MVx3[y] is the third horizontal direction motion vector for a y-th scanning line, the MVx2a is the second horizontal direction motion vector for a first frame, the MVx2b is the second horizontal direction motion vector for a second frame following the first frame, the MVy3[y] is the third vertical direction motion vector for the y-th scanning line, the MVy2a is the second vertical direction motion vector for the first frame, the MVy2b is the second vertical direction motion vector for the second frame, and the "H" is the number of total scanning line.

6. The system of claim 1, wherein the motion vector interpolator is configured to generate the third horizontal direction motion vector based on a following equation (7) and generate the third vertical direction motion vector based on a following equation (8), $$MVx3[y]=\{MVx2b*y+MVx2a*(H-y)\}*a>>Sft1 \tag{7}$$

$$MVy3[y]=\{MVy2b*y+MVy2a*(H-y)\}*a>>Sft1 \tag{8}$$

where the MVx3[y] is the third horizontal direction motion vector for a y-th scanning line, the MVx2a is the second horizontal direction motion vector for a first frame, the MVx2b is the second horizontal direction motion vector for a second frame following the first frame, the MVy3[y] is the third vertical direction motion vector for the y-th scanning line, the MVy2a is the second vertical direction motion vector for the first frame, the MVy2b is the second vertical direction motion vector for the second frame, the "H" is the number of total scanning line, the "a" is an arbitrary constant, the "Sft1" is an arbitrary bit shift amount.

7. The system of claim 1, wherein the motion vector converter is configured to generate the second horizontal direction motion vector based on a following equation (9) and generate the second vertical direction motion vector based on a following equation (10), $$MVx2=MVx1*H/(MVy1+H) \tag{9}$$

$$MVy2=MVy1*H/(MVy1+H) \tag{10}$$

where the MVx2 is the second horizontal direction motion vector, the MVx1 is the first horizontal direction motion vector, MVy2 is the second vertical direction motion vector, the MVy1 is the first vertical direction motion vector, and the "H" is the number of total scanning line.

8. The system of claim 1, wherein the correcting module is configured to replace a pixel to be corrected by a pixel located at a position shifted by the horizontal direction correction amount and the vertical direction correction amount from a position at which the pixel to be corrected locates.

9. The system of claim 1, wherein when at least one of the horizontal direction correction amount and the vertical direction correction amount have decimal parts, the correcting module is configured to generate a first pixel at a position shifted by the horizontal direction correction amount and the vertical direction correction amount from a pixel to be corrected by using one or more pixel around the first pixel, and is configured to replace the pixel to be corrected by the first pixel.

10. The system of claim 1, wherein the pickup apparatus is a Complementary Metal-Oxide-Semiconductor (CMOS) sensor.

11. The system of claim 1 further comprising a display configured to display the output video signal.

12. The system of claim 1 further comprising a recording medium configured to store the output video signal.

13. An image processing device comprising:
a motion vector generator configured to generate a first horizontal direction motion vector and a first vertical direction motion vector indicative of a horizontal direction moving distance and a vertical direction moving distance respectively between frames of an input video signal, the input video signal being generated from an image captured per scanning line;
a motion vector converter configured to convert the first horizontal direction motion vector and the first vertical direction motion vector to a second horizontal direction motion vector and a second vertical direction motion vector respectively taking the first vertical direction motion vector into consideration, the second horizontal direction motion vector and the second vertical direction motion vector being indicative of a horizontal direction moving distance and a vertical direction moving distance respectively per a time for capturing one frame;
a motion vector interpolator configured to generate a third horizontal direction motion vector and a third vertical direction motion vector indicative of a horizontal direction moving distance and a vertical direction moving distance per a time for capturing one frame for each scanning line by performing interpolation using the second horizontal direction motion vector and the second vertical direction motion vector on at least two frames;
a correction amount generator configured to generate a horizontal direction correction amount and a vertical direction correction amount for each scanning line based on the third horizontal direction motion vector and the third vertical direction motion vector; and
a correcting module configured to correct the input video signal to produce an output video signal based on the horizontal direction correction amount and the vertical direction correction amount.

14. The device of claim 13, wherein the correction amount generator is configured to generate the horizontal direction correction amount based on a following equation (11) and generate the vertical direction correction amount based on a following equation (12), $$MODx[y] = \sum_{v=0}^{y} \frac{MVx3[v]}{H} \quad (11)$$

$$MODy[y] = \sum_{v=0}^{y} \frac{MVy3[v]}{H} \quad (12)$$

where the MODx[y] is the horizontal direction correction amount for a y-th scanning line, the MVx3[v] is the third horizontal direction motion vector for a v-th scanning line, the MODy[y] is the vertical direction correction amount for the y-th scanning line, the MVy3[v] is the third vertical direction motion vector for the v-th scanning line, and the "H" is the number of total scanning line.

15. The device of claim 13, wherein the correction amount generator is configured to generate the horizontal direction correction amount based on a following equation (13) and generate the vertical direction correction amount based on a following equation (14), $$MODx[y] = b * \sum_{v=0}^{y} MVx3[v] >> Sft2 \quad (13)$$

$$MODy[y] = b * \sum_{v=0}^{y} MVy3[v] >> Sft2 \quad (14)$$

where the MODx[y] is the horizontal direction correction amount for a y-th scanning line, the MVx3[v] is the third horizontal direction motion vector for a v-th scanning line, the MODy[y] is the vertical direction correction amount for the y-th scanning line, the MVy3[v] is the third vertical direction motion vector for the v-th scanning line, the "b" is an arbitrary constant, the "Sft2" is an arbitrary bit shift amount.

16. The device of claim 13, wherein the motion vector interpolator is configured to generate the third horizontal direction motion vector based on a following equation (15) and generate the third vertical direction motion vector based on a following equation (16), $$MVx3[y] = \{MVx2b*y + MVx2a*(H-y)\}/H \quad (15)$$

$$MVy3[y] = \{MVy2b*y + MVy2a*(H-y)\}/H \quad (16)$$

where the MVx3[y] is the third horizontal direction motion vector for a y-th scanning line, the MVx2a is the second horizontal direction motion vector for a first frame, the MVx2b is the second horizontal direction motion vector for a second frame following the first frame, the MVy3[y] is the third vertical direction motion vector for the y-th scanning line, the MVy2a is the second vertical direction motion vector for the first frame, the MVy2b is the second vertical direction motion vector for the second frame, and the "H" is the number of total scanning line.

17. The device of claim 13, wherein the motion vector interpolator is configured to generate the third horizontal direction motion vector based on a following equation (17) and generate the third vertical direction motion vector based on a following equation (18), $$MVx3[y] = \{MVx2b*y + MVx2a(H-y)\}*a >> Sft1 \quad (17)$$

$$MVy3[y] = \{MVy2b*y + MVy2a*(H-y)\}*a >> Sft1 \quad (18)$$

where the MVx3[y] is the third horizontal direction motion vector for a y-th scanning line, the MVx2a is the second horizontal direction motion vector for a first frame, the MVx2b is the second horizontal direction motion vector for a second frame following the first frame, the MVy3[y] is the third vertical direction motion vector for the y-th scanning line, the MVy2a is the second vertical direction motion vector for the first frame, the MVy2b is the second vertical direction motion vector for the second frame, the "H" is the number of total scanning line, the "a" is an arbitrary constant, the "Sft1" is an arbitrary bit shift amount.

18. The device of claim 13, wherein the motion vector converter is configured to generate the second horizontal direction motion vector based on a following equation (19) and generate the second vertical direction motion vector based on a following equation (20), $$MVx2 = MVx1 * H/(MVy1+H) \quad (19)$$

$$MVy2 = MVy1 * H/(MVy1+H) \quad (20)$$

where the MVx2 is the second horizontal direction motion vector, the MVx1 is the first horizontal direction motion vector, MVy2 is the second vertical direction motion vector, the MVy1 is the first vertical direction motion vector, and the "H" is the number of total scanning line.

19. The device of claim 13, wherein when at least one of the horizontal direction correction amount and the vertical direction correction amount have decimal parts, the correcting module is configured to generate a first pixel at a position shifted by the horizontal direction correction amount and the vertical direction correction amount from a pixel to be corrected by using one or more pixel around the first pixel, and is configured to replace the pixel to be corrected by the first pixel.

20. An image processing method comprising:
generating a first horizontal direction motion vector and a first vertical direction motion vector indicative of a horizontal direction moving distance and a vertical direction moving distance respectively between frames of an input video signal, the input video signal being generated from an image captured per scanning line;
converting the first horizontal direction motion vector and the first vertical direction motion vector to a second horizontal direction motion vector and a second vertical direction motion vector respectively taking the first vertical direction motion vector into consideration, the second horizontal direction motion vector and the second vertical direction motion vector being indicative of a horizontal direction moving distance and a vertical direction moving distance respectively per a time for capturing one frame;
generating a third horizontal direction motion vector and a third vertical direction motion vector indicative of a horizontal direction moving distance and a vertical direction moving distance per a time for capturing one frame for each scanning line by performing interpolation using the second horizontal direction motion vector and the second vertical direction motion vector on at least two frames;
generating a horizontal direction correction amount and a vertical direction correction amount for each scanning line based on the third horizontal direction motion vector and the third vertical direction motion vector; and
correcting the input video signal to produce an output video signal based on the horizontal direction correction amount and the vertical direction correction amount.

* * * * *